No. 683,965. Patented Oct. 8, 1901.
O. W. MEYROWITZ & F. BUCHHOP.
REFRACTOMETER.
(Application filed Jan. 19, 1901.)
(No Model.) 4 Sheets—Sheet 1.

WITNESSES:
Frank D. Ober
Waldo M. Chapin

INVENTORS
Oscar W. Meyrowitz
Ferdinand Buchhop
BY
M. A. Rosenbaum
ATTORNEY

No. 683,965. Patented Oct. 8, 1901.
O. W. MEYROWITZ & F. BUCHHOP.
REFRACTOMETER.
(Application filed Jan. 19, 1901.)
(No Model.) 4 Sheets—Sheet 3.

WITNESSES:
Frank D. Ober
Waldo M. Chapin

INVENTORS
Oscar W. Meyrowitz
Ferdinand Buchhop
BY
Rosenbaum
ATTORNEY

No. 683,965. Patented Oct. 8, 1901.
O. W. MEYROWITZ & F. BUCHHOP.
REFRACTOMETER.
(Application filed Jan. 19, 1901.)
(No Model.) 4 Sheets—Sheet 4.
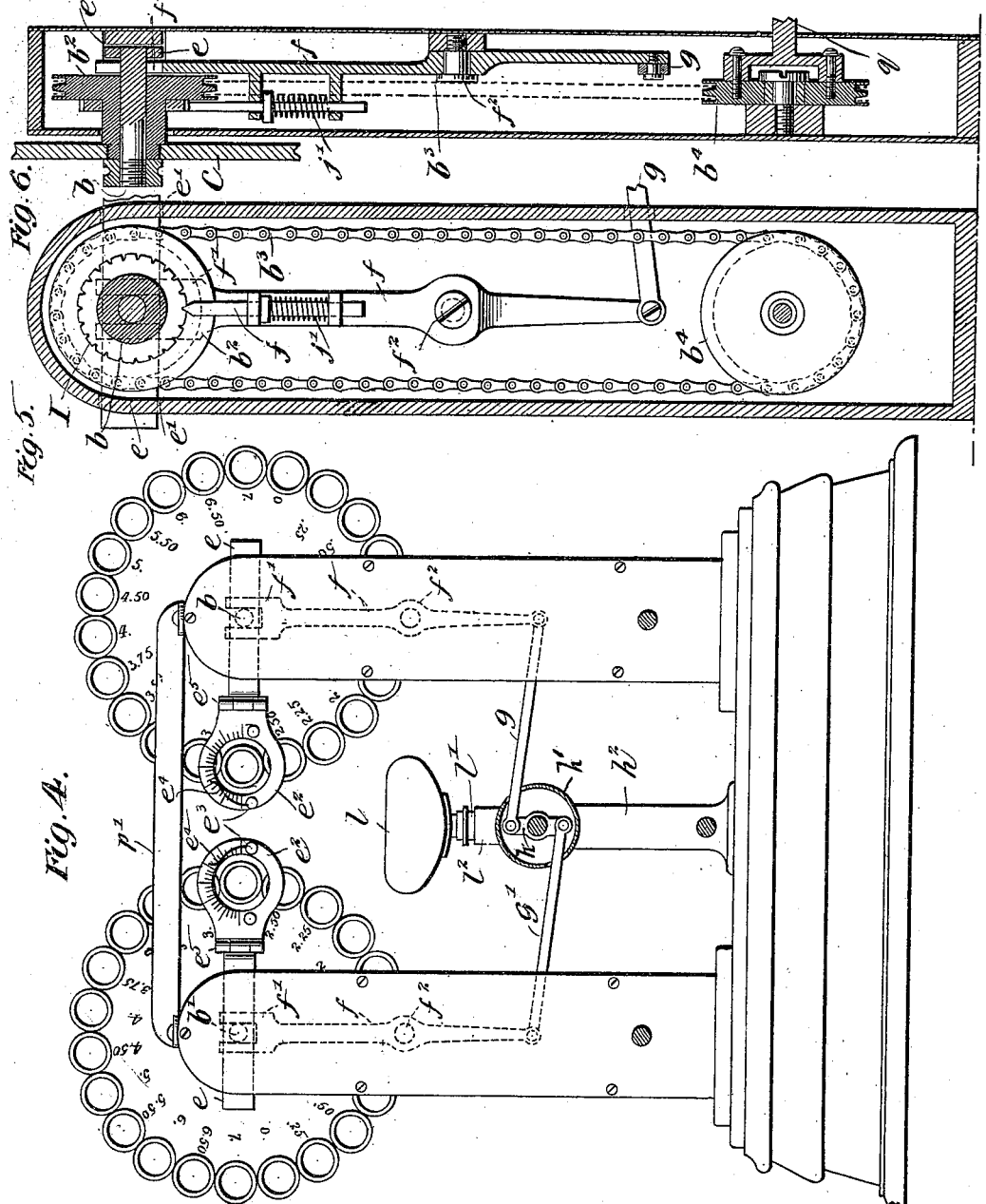

UNITED STATES PATENT OFFICE.

OSCAR W. MEYROWITZ, OF NEW ROCHELLE, AND FERDINAND BUCHHOP, OF NEW YORK, N. Y., ASSIGNORS TO THE MEYROWITZ MANUFACTURING CO., OF NEW JERSEY.

REFRACTOMETER.

SPECIFICATION forming part of Letters Patent No. 683,965, dated October 8, 1901.

Application filed January 19, 1901. Serial No. 43,915. (No model.)

*To all whom it may concern:*

Be it known that we, OSCAR W. MEYROWITZ, residing at New Rochelle, Westchester county, and FERDINAND BUCHHOP, residing at the city of New York, borough of Brooklyn, State of New York, citizens of the United States, have invented certain new and useful Improvements in Refractometers, of which the following is a full, clear, and exact description.

This invention relates to optical instruments, and has special reference to refractometers.

The object of the invention is to provide an instrument which can be conveniently and quickly manipulated by an oculist, optician, or physician to obtain the indices of refraction of the eyes of a patient.

In devising the instrument it has also been the object to make an apparatus which shall be as cheap as possible to build consistent with accuracy of action or operation.

Our improved refractometer is adapted for examining both eyes at once, and to that extent the instrument may be considered as double. It, however, embodies devices for simultaneously shifting the interpupilary distance, a single adjustable chin-rest, and other features which relate the two parts into a single machine or instrument.

The invention consists of the construction and combinations hereinafter fully described, and particularly pointed out in the claims.

Figure 1:
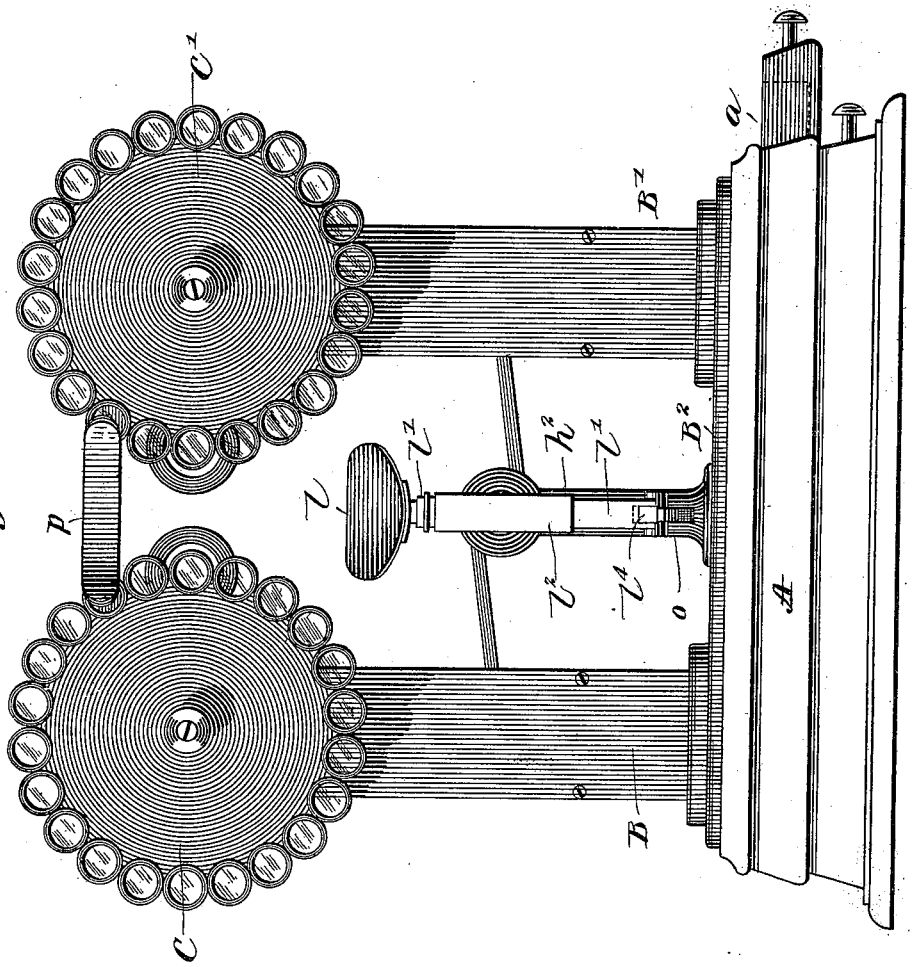
Figure 2:
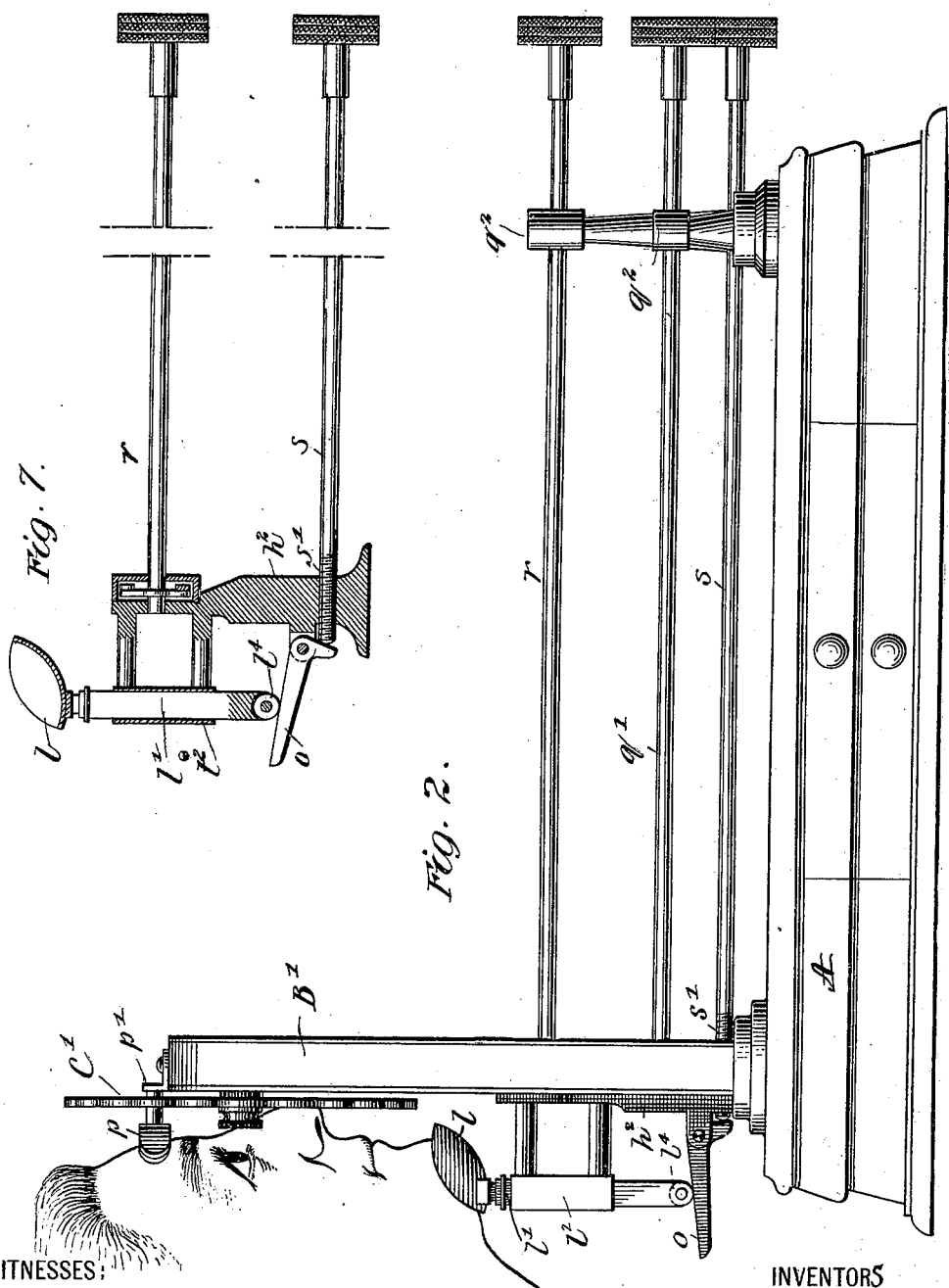
Figure 3:
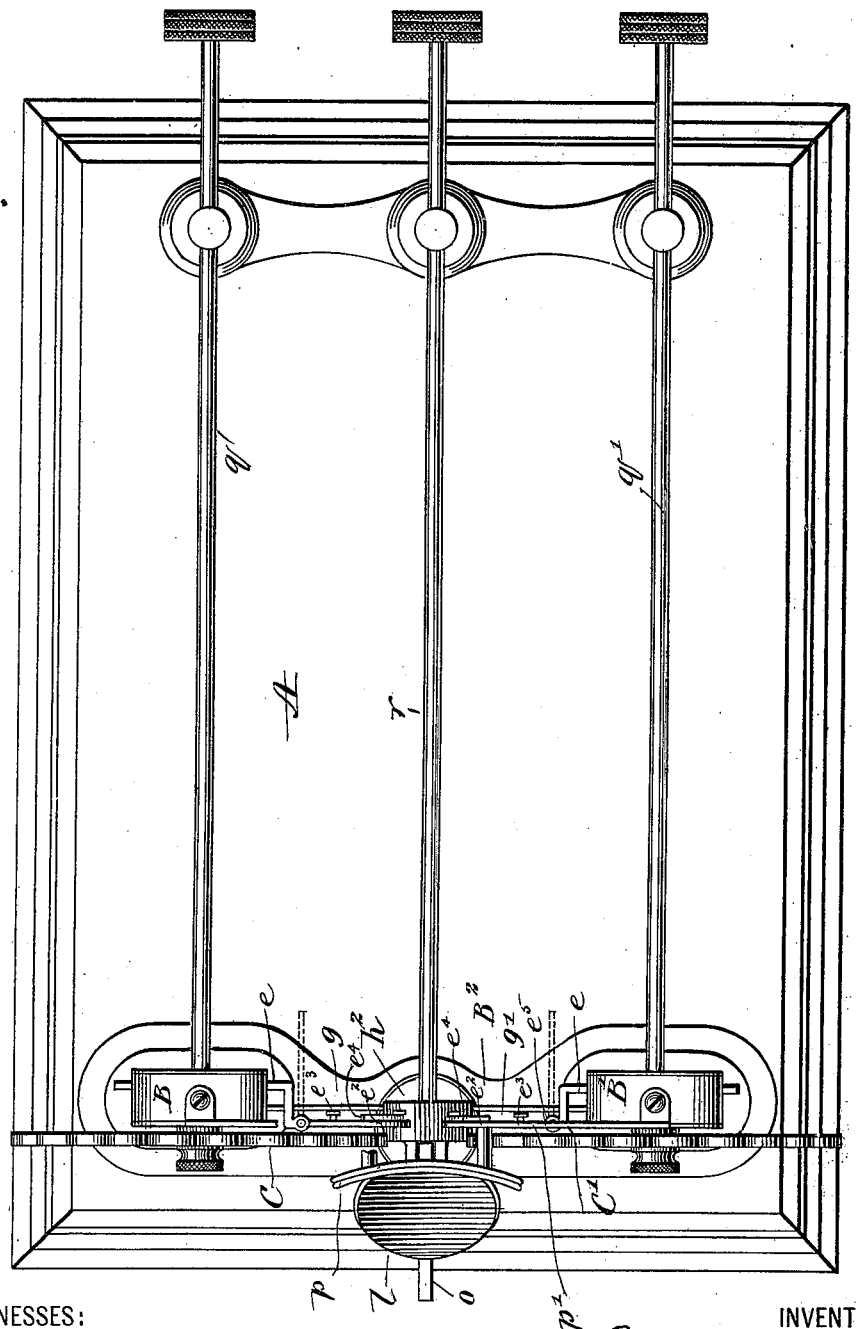

In the accompanying drawings, Figure 1 is a front elevation of the instrument. Fig. 2 is a side elevation. Fig. 3 is a plan; Fig. 4, a rear elevation, partly in section; Fig. 5, a detail section of one of the standards; Fig. 6, a section of the standard, taken at right angles to the view shown in Fig. 5; and Fig. 7, a detail of the chin-rest.

Referring to the drawings by letter, A represents a base, upon which the parts of the instrument are mounted and which will preferably be provided with drawers $a$ or compartments for extra parts of the instrument or other purposes. At one end of the base are mounted two hollow standards B and B', respectively, firmly anchored to a foot-plate $B^2$, secured to the base. At the upper end of each standard is an axle $b$ and $b'$, respectively, which extends through the front plate of the standard and is adapted to receive thereon a disk C or C', carrying around its edge a series of lenses of graduated refractive power. On the axes with each disk is a spur-wheel $b^2$, over which a chain $b^3$ passes and leads thence to the lower part of the standard, where it passes around a similar spur-wheel $b^4$ on a shaft to be hereinafter described. The axes $b$ and $b'$ project through transverse slots in the front plates of the standards to afford lateral movement, each axis being fixed to a sliding plate $e$. This plate moves through guide-openings $e'$ in the standard, which insures a true horizontal movement of the axis and the disk which it carries. In order to impart this lateral movement to the disks each axis $b$ and $b'$ is embraced by a fork $f'$ on the end of a lever $f$, pivotally mounted at $f^2$, inside of the standards. The lower end of each lever $f$ is connected by a link $g$ or $g'$ with the opposite ends of a cross-head $h$, located in a circular casing $h'$ on the upper end of a short standard $h^2$, placed between the two larger standards. The links $g$ and $g'$ pass through suitable openings in the standards and in the casing $h'$ in order to make the connections described. The cross-head is centrally fixed to the end of an operating-rod, hereinafter referred to.

On each of the axes $b$ and $b'$ is fitted a notched disk $i$, having as many V-shaped notches in its periphery as there are lenses in the disk C. A bolt $j$, with a wedge-shaped point, is held against the periphery of the notched disk by a spring $j'$, and the bolt is carried by the lever $f$ in order to partake of the lateral movements of the axis of the disk. The function of this bolt is to control the rotation of the disk by holding it when it has once been brought to the desired position. The bolt in effect insures a step-by-step motion of the disk when it is rotated and brings each lens to a position directly in front of the pupil of the eye under examination. The laterally-sliding plates $e$, in which the axes $b$ and $b'$ are carried, each have hinged to them at $e^5$ a plate $e^2$, containing a circular opening, the center of which is the same radial distance from the axis as the center of the lenses in the disk carried by the axis, and the plate is arranged in a plane parallel to the disk and immediately back of it. Around the edge of the circular openings in the plate a scale is marked, and fittings, such as a stud $e^3$ and a spring $e^4$, are provided for the temporary adjustment of lenses.

Immediately in front of the disks and midway between the standards is placed an adjustable chin-rest, in which the chin of the patient is supported in order to hold the eyes at a constant level. This chin-rest consists of a rounded socket or seat $l$ on the upper end of a square post $l'$, adapted to slide vertically in a sleeve $l^2$, suitably supported by brackets from the standard $h^2$. The lower end of the post carries an antifriction-roller $l^4$, which rests upon one end of a bell-crank lever $o$, pivoted in a bracket projecting from the base of the standard $h^2$, and with its second arm extending downward and resting against the end of an operating-rod, which will be hereinafter described. To maintain the eyes at a constant distance from the lenses, a stop or rest $p$ for the forehead is provided and is sustained by the cross-frame $p'$. (Shown broken away in Fig. 3.)

The manipulating devices connected with this instrument consist of a number of rods extending from the standards some distance to the rear of the machine, where they are equipped with suitable hand-wheels for manipulation by the operator. For rotating the lens-disks C and C' the rods $q$ and $q'$, respectively, are used. These rods have their bearings in posts $q^2$ and extending forward enter the lower ends of the standards B and B' to form the axes of the wheels $b^4$. By twisting or rotating these rods the motion is communicated through the chains $b^3$ to the spur-wheels $b^2$ and to the lens-disks, the motion being step by step from one lens to the next by reason of the action of the spring-bolt $j$. For adjusting the two lens-disks to make the interpupilary distance agree with that of the eyes of the patient the rod $r$ is rotated or twisted. This acts simultaneously upon both disks and either separates them or moves them toward each other, depending upon the direction of rotation. The rod enters the casing $h'$ and is attached to the center of the cross-head $h$ therein. The rotation of the cross-head is communicated through the links $g$ and $g'$ to the levers $f$, which shift the axes of the lens-disks in opposite directions. It will be observed that this motion is also imparted to the plates $e^2$, and so always maintains the lenses carried thereby at the proper distance apart. The chin-rest is raised and lowered to bring the eyes of the patient to the proper elevation by manipulating the rod $s$. This rod is provided with a thread $s'$ at its forward end, which works in a threaded opening in the base of the standard $h^2$ and impinges against one arm of the bell-crank lever $o$. By turning the rod in one direction the chin-rest is forced upward, while by turning it in the other direction the weight on the chin-rest will lower it accordingly.

In using the instrument the patient is placed in the position indicated in Fig. 2, the eyes are brought into the same horizontal plane with the axes of the lens-disks, the interpupilary distance is adjusted by bodily moving the disks, and then the various lenses are successively or in any order brought before the respective eyes until the proper vision is secured.

The plates $e^2$ are used to determine the proper "axis." Lenses are inserted therein and turned until the axis fits the eye, the scale then indicating the angle. When the disks are in use, the plates are turned back to the position shown in dotted lines in Fig. 2.

Having described our invention, we claim—

1. In a refractometer, the combination of a pair of lens-disks mounted upon shiftable axes, two forked levers embracing the respective axes, a rotatable rod and connections between the rod and both levers whereby the disks may be shifted simultaneously toward or away from each other.

2. In a refractometer, the combination of a pair of lens-disks, two stationary standards provided with slideways, axes for the respective disks adapted to move in said slideways, two forked levers embracing the respective axes, a rotatable rod and connections between the rod and both levers whereby the disks may be shifted simultaneously toward or away from each other, and two chain-wheels, one on the axis of a disk and the other on the fixed standard, a driving-chain connecting the wheels and means for rotating the fixed wheel by hand, for the purpose of rotating the disk on its axis.

3. In a refractometer, the combination of two lens-disks mounted upon shiftable axes, a pivoted lever engaging with each axis, a cross-head and links connecting the opposite ends of the same with respective ends of the levers, and a rotatable rod carrying said cross-head, whereby the disks may be shifted simultaneously in opposite directions.

4. In an optical instrument, the combination of a lens-disk having a shiftable axis, a wheel mounted on said axis, a fixed manipulating-rod, a wheel fixed upon said rod, and a chain passing around both of said wheels, substantially as described.

5. In an optical instrument, the combination of a stationary hollow standard, an axis or shaft fitted to slide laterally in one end thereof and adapted to carry a lens-disk, a sprocket-wheel on said shaft and located inside of the standard, a second wheel located in the opposite end of said standard, a drive-chain connecting the two wheels, and a rotatable rod carrying the said second wheel and extending outside of the standard, substantially as described.

In witness whereof we subscribe our signatures in presence of two witnesses.

OSCAR W. MEYROWITZ.
FERDINAND BUCHHOP.

Witnesses:
JEAN SCHMIDT,
DAVID K. UTTAL.